US011325420B2

(12) United States Patent
Suzumori

(10) Patent No.: US 11,325,420 B2
(45) Date of Patent: May 10, 2022

(54) AIRCRAFT TIRE

(71) Applicant: BRIDGESTONE CORPORATION, Tokyo (JP)

(72) Inventor: Kiichiro Suzumori, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 72 days.

(21) Appl. No.: 16/772,640

(22) PCT Filed: Nov. 21, 2018

(86) PCT No.: PCT/JP2018/043049
§ 371 (c)(1),
(2) Date: Jun. 12, 2020

(87) PCT Pub. No.: WO2019/116849
PCT Pub. Date: Jun. 20, 2019

(65) Prior Publication Data
US 2021/0078366 A1 Mar. 18, 2021

(30) Foreign Application Priority Data

Dec. 13, 2017 (JP) .............................. JP2017-239014

(51) Int. Cl.
*B60C 15/06* (2006.01)
*B60C 9/08* (2006.01)
(52) U.S. Cl.
CPC ............ *B60C 9/08* (2013.01); *B60C 15/0628* (2013.01); *B60C 2015/0692* (2013.01); *B60C 2200/02* (2013.01)
(58) Field of Classification Search
CPC ................ B60C 15/0009; B60C 15/06; B60C 2015/0621; B60C 2015/0625; B60C 9/02; B60C 2009/1885; B60C 2009/0223
See application file for complete search history.

(56) References Cited

U.S. PATENT DOCUMENTS 4,234,029 A * 11/1980 Peter ....................... B60C 15/06
152/542
5,036,896 A * 8/1991 Welter ................... B60C 9/2009
152/543
(Continued)

FOREIGN PATENT DOCUMENTS

EP   2 444 258 A2   4/2012
FR   2 999 475 A1   6/2014
(Continued)

OTHER PUBLICATIONS

International Search Report for PCT/JP2018/043049 dated Feb. 12, 2019 [PCT/ISA/210].
(Continued)

*Primary Examiner* — Cedrick S Williams
(74) *Attorney, Agent, or Firm* — Sughrue Mion, PLLC

(57) ABSTRACT

Provided is an aircraft tire which has both satisfactory light weight and satisfactory separation durability of carcass ply ends. An aircraft tire (10) includes a pair of bead cores (1), and a carcass (2) extending between the pair of the bead cores (1). In this aircraft tire (10), the carcass (2) includes at least one layer of a turn-up ply (2*a*) which is composed of a main body (2*aa*) and folded portions (2*ab*), and at least one layer of a down ply (2*b*) which covers a tire width-direction outer side of the respective folded portions (2*ab*) of the turn-up ply (2*a*) and extends to at least a tire radial-direction inner side of the respective bead cores (1); rubber-cord reinforcing members (6) are each arranged between the main body (2*aa*) of an outermost turn-up ply (2*a*) and the folded portion (2*ab*) of the turn-up ply (2*a*) extending to a tire radial-direction outermost side, and between the folded portion (2*ab*) of the turn-up ply (2*a*) extending to the tire radial-direction outermost side and an innermost down ply (Continued)

(2b); and cords of the rubber-cord reinforcing members (6) have an elongation at break of not less than 30%.

19 Claims, 2 Drawing Sheets

(56) References Cited

U.S. PATENT DOCUMENTS

| | | | |
|---|---|---|---|
| 5,335,707 | A | 8/1994 | Sano et al. |
| 2012/0097311 | A1 | 4/2012 | Ueyoko |
| 2013/0239539 | A1* | 9/2013 | Li .................. B60C 9/0042 57/3 |
| 2015/0020942 | A1 | 1/2015 | Lamontia et al. |
| 2015/0328939 | A1 | 11/2015 | Estenne |
| 2016/0167452 | A1 | 6/2016 | Ueyoko et al. |

FOREIGN PATENT DOCUMENTS

| | | |
|---|---|---|
| JP | 04-237607 A | 8/1992 |
| JP | 05-069703 A | 3/1993 |
| JP | 06-297906 A | 10/1994 |
| JP | 2001-047821 A | 2/2001 |
| JP | 2002-337517 A | 11/2002 |
| JP | 2005-178483 A | 7/2005 |
| JP | 2009-202661 A | 9/2009 |
| JP | 2009-269426 A | 11/2009 |
| JP | 2010115953 A | 5/2010 |
| JP | 2016-113144 A | 6/2016 |

OTHER PUBLICATIONS

Written Opinion for PCT/JP2018/043049 dated Feb. 12, 2019 [PCT/ISA/237].
Extended European Search Report dated Jul. 9, 2021, issued by the European Patent Office in application No. 18889166.7.

* cited by examiner

AIRCRAFT TIRE

CROSS REFERENCE TO RELATED APPLICATIONS

This application is a National Stage of International Application No. PCT/JP2018/043049 filed Nov. 21, 2018, claiming priority based on Japanese Patent Application No. 2017-239014 filed Dec. 13, 2017.

TECHNICAL FIELD

The present invention relates to an aircraft tire (hereinafter, also simply referred to as "tire"), more particularly an aircraft tire which has both satisfactory light weight and satisfactory separation durability of carcass ply ends.

BACKGROUND ART

Since aircraft tires are, because of their application, used under the conditions of a higher internal pressure and a higher load as compared to those tires used on passenger vehicles, a larger tension is applied to the ends of their reinforcing members. Thus, for example, an improvement in the separation durability at the ends of the reinforcing members presents a major challenge. In addition, aircraft manufacturers are making stringent demands on tire weight reduction. Therefore, it has been adopted a method of reducing the number of laminated carcass plies by using high-strength organic fibers in ply cords of carcass plies.

Under such circumstances, in Patent Document 1, the pressure resistance and the durability are improved while achieving a weight reduction by configuring a carcass to include: at least one layer of a turn-up ply, which is composed of a main body extending between bead cores, and folded portions that are folded and extend around the respective bead cores from a tire width-direction inner side to an outer side; and at least one layer of a down ply, which covers a tire width-direction outer side of the respective folded portions of the turn-up ply and extends to at least a radial-direction inner side of the respective bead cores, and allowing cords in at least end regions of the folded portions of the turn-up ply to have a corrugated shape.

RELATED ART DOCUMENT

Patent Document

[Patent Document 1] JP2009-269426A

SUMMARY OF THE INVENTION

Problems to be Solved by the Invention

However, in the tire proposed in Patent Document 1, since the cords in at least the end regions of the folded portions of the turn-up ply have a corrugated shape, there are problems of, for example, a loss in man-hour in the production. Therefore, another alternative method is demanded at present.

In view of the above, an object of the present invention is to provide an aircraft tire equipped with a carcass including a turn-up ply and a down ply, which aircraft tire satisfies both a light weight and separation durability of carcass ply ends without causing the above-described problems.

Means for Solving the Problems

The present inventor intensively studied to solve the above-described problems, focusing on the shear strain of rubber between a turn-up ply and a down ply. As a result, the present inventor discovered that shear deformation of rubber between a turn-up ply and a down ply can be reduced and the above-described problems can be solved by arranging a rubber-cord reinforcing member containing cords having a prescribed elongation at break between the turn-up ply and the down ply, thereby completing the present invention.

That is, the aircraft tire of the present invention is an aircraft tire including: a pair of bead cores; and a carcass extending between the pair of the bead cores, which aircraft tire is characterized in that:

the carcass includes: at least one layer of a turn-up ply, which is composed of a main body extending between the bead cores, and folded portions that are folded and extend around the respective bead cores from a tire width-direction inner side to an outer side; and at least one layer of a down ply, which covers a tire width-direction outer side of the respective folded portions of the turn-up ply and extends to at least a tire radial-direction inner side of the respective bead cores;

rubber-cord reinforcing members are each arranged between the main body of a tire width-direction outermost turn-up ply and the folded portion of a turn-up ply extending to a tire radial-direction outermost side, and between the folded portion of the turn-up ply extending to the tire radial-direction outermost side and a tire width-direction innermost down ply, and cords of the rubber-cord reinforcing members have an elongation at break of not less than 30%.

The term "elongation at break" refers to a degree of elongation at a point when a reinforcing cord removed from a tire is stretched to breakage, which is measured in accordance with the measurement conditions prescribed in JIS L1017.

In the tire of the present invention, it is preferred that the cords of the rubber-cord reinforcing members have a total fineness of 100 to 1,000 dtex. Further, in the tire of the present invention, it is preferred that the cords of the rubber-cord reinforcing members have an elongation at break of 30% to 45%. Still further, in the tire of the present invention, it is preferred that the cords of the rubber-cord reinforcing members have a final twist coefficient of 0.25 to 0.60. Yet still further, in the tire of the present invention, it is preferred that the cords of the rubber-cord reinforcing members be made of nylon.

Effects of the Invention

According to the present invention, an aircraft tire which has both satisfactory light weight and satisfactory separation durability of carcass ply ends can be provided.

MODE FOR CARRYING OUT THE INVENTION

Figure 1:
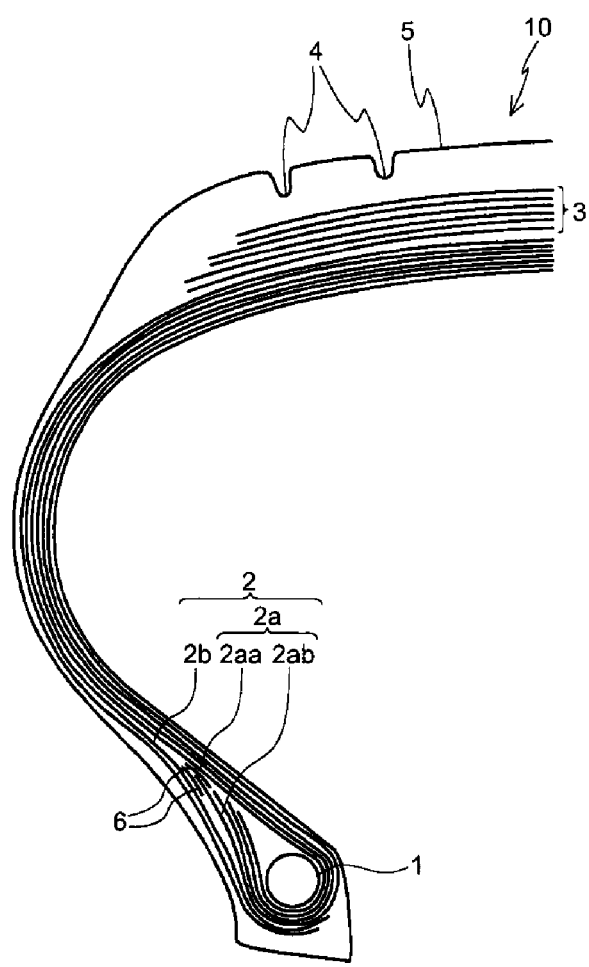
FIG. 1 is a widthwise half cross-sectional view illustrating an aircraft tire according to one preferred embodiment of the present invention.

The aircraft tire of the present invention will now be described in detail referring to the drawings.

FIG. 1 is a widthwise half cross-sectional view illustrating an aircraft tire according to one preferred embodiment of the present invention. As illustrated in FIG. 1, an aircraft tire 10 of the present invention includes a carcass 2 arranged between a pair of bead cores 1. In the illustrated tire 10, a belt 3 composed of plural belt layers (six belt layers in the illustrated example) and a tread 5 having plural circumferential grooves 4 extending along a tire circumferential direction are sequentially arranged on a radial-direction outer side of the carcass 2; however, the structure of the tire of the present invention is not restricted thereto. The carcass 2 is composed of plural carcass plies and the carcass plies are, for example, embedded with ply cords arranged substantially perpendicular to a tire equator. The term "substantially perpendicular" used herein specifically means that the angle with respect to the tire equator is in a range of 85° to 95°.

In the tire 10 of the present invention, the carcass 2 includes: at least one layer of a turn-up ply 2a, which is composed of a main body 2aa extending between the bead cores 1, and folded portions 2ab that are folded and extend around the respective bead cores 1 from a tire width-direction inner side to an outer side; and at least one layer of a down ply 2b, which covers a tire width-direction outer side of the respective folded portions 2ab of the turn-up ply 2a and extends to at least a tire radial-direction inner side of the respective bead cores 1. In the illustrated tire, the carcass 2 is composed of four layers of the turn-up plies 2a and two layers of the down plies 2b.

In the tire 10 of the present invention, rubber-cord reinforcing members 6 are each arranged between the main body 2aa of a tire width-direction outermost turn-up ply and the folded portion 2ab of a turn-up ply extending to a tire radial-direction outermost side, and between the folded portion 2ab of the turn-up ply extending to the tire radial-direction outermost side and a tire width-direction innermost down ply 2b. In the illustrated preferred embodiment, the rubber-cord reinforcing members 6 are each arranged between the main body 2aa of the tire width-direction outermost turn-up ply and the folded portion 2ab of the tire width-direction innermost turn-up ply, and between the folded portion 2ab of the tire width-direction innermost turn-up ply and the tire width-direction innermost down ply 2b.

Figure 2:
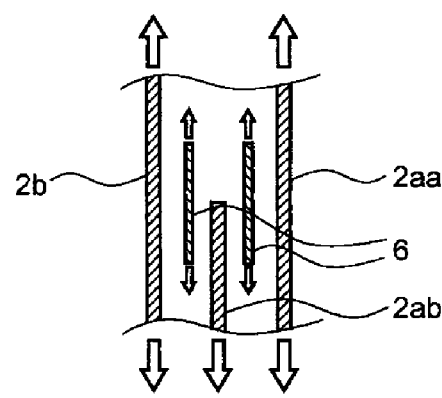
FIG. 2A is a schematic view of the vicinity of a folded portion of a turn-up ply extending to a tire radial-direction outermost side according to a tire of the present invention.
FIG. 2B is a schematic view of the vicinity of a folded portion of a turn-up ply extending to a tire radial-direction outermost side according to a conventional tire.
Figure 2:
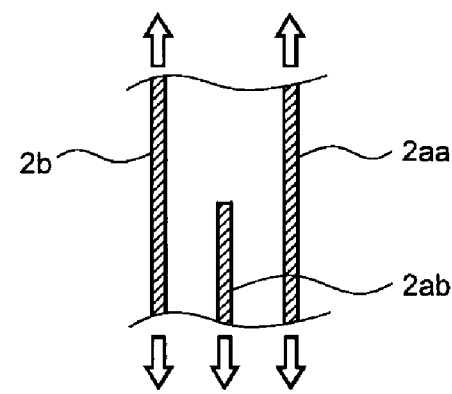

FIGS. 2A and 2B provide schematic drawings of the vicinity of a folded portion of a turn-up ply extending to a tire radial-direction outermost side, with FIG. 2A illustrating a tire of the present invention and FIG. 2B illustrating a conventional tire. As illustrated in FIG. 2B, in a conventional tire, the folded end 2ab of the turn-up ply extending to the tire radial-direction outermost side is arranged between the main body 2aa of the tire width-direction outermost turn-up ply and the tire width-direction innermost down ply 2b. When a tension of the carcass is increased in this state, a force is applied toward the tire radial-direction outer side on the main body of the turn-up ply and the down ply, and toward the tire radial-direction inner side on the folded portion of the turn-up ply. As a result, shear deformation of rubber occurs between the main body 2aa of the outermost turn-up ply and the folded portion 2ab of the turn-up ply extending to the tire radial-direction outermost side, as well as between the folded portion 2ab of the turn-up ply extending to the tire radial-direction outermost side and the innermost down ply 2b. In addition, a variation in the tension distribution is generated between the carcass plies, and this causes the folded end 2ab of the turn-up ply extending to the tire radial-direction outermost side to have the highest tension, making ply-end separation likely to occur.

Therefore, in the tire 10 of the present invention, as illustrated in FIG. 2A, the rubber-cord reinforcing members 6 are each arranged between the main body 2aa of the tire width-direction outermost turn-up ply and the folded portion 2ab of the turn-up ply extending to the tire radial-direction outermost side, and between the folded portion 2ab of the turn-up ply extending to the tire radial-direction outermost side and the tire width-direction innermost down ply 2b. By adopting this structure, the above-described shear deformation of rubber is inhibited, and a variation of the tension between the carcass plies is reduced, whereby the durability of the end of the folded portion 2ab of the turn-up ply extending to the tire radial-direction outermost side is improved. Moreover, since this structure makes the tension applied to the carcass plies uniform, application of an excessive tension to the outermost turn-up ply 2a is inhibited. As a result, the number of turn-up plies can be reduced, which leads to a reduction in the tire weight.

In the tire 10 of the present invention, cords of the rubber-cord reinforcing members 6 have an elongation at break of not less than 30%. This is because a shear strain of rubber cannot be sufficiently relieved when the elongation at break of the cords is less than 30%. Meanwhile, when the elongation at break of the cords exceeds 45%, it is difficult to secure the rigidity of the cords. Accordingly, considering the balance between the elongation at break of the rubber-cord reinforcing members 6 and the cord rigidity, the cords preferably have an elongation at break of 30% to 45%.

In the tire 10 of the present invention, the elongation at break and the rigidity of the cords constituting the rubber-cord reinforcing members 6 can be adjusted by modifying the conditions of a dipping treatment and adjusting the twist number of the cords.

As for a method of modifying the conditions of the dipping treatment, for example, in a dipping process of the cords, an increase in the tension tends to result in an increase in the cord strength and a reduction in the cord elongation under a stress load, and an increase in the temperature or the exposure time tends to result in a reduction in the cord strength and a reduction in the cord elongation under a stress load. Accordingly, by modifying these dipping conditions in combination as appropriate, the cord physical properties can be adjusted as desired.

Further, when the twist coefficient is adjusted, the final twist coefficient is preferably 0.25 to 0.60. The final twist coefficient is represented by the following formula:

$$\alpha = \text{Tan } \theta = 0.001 \times N \times \sqrt{(0.125 \times d/p)}.$$

In this formula, N represents the final twist number (times/10 cm), d represents a half of the total decitex value of the cords, and p represents the specific gravity of the cords. When the final twist coefficient is higher than 0.60, the cord rigidity may be insufficient, which is not preferred. Meanwhile, when the final twist coefficient is lower than 0.25, a sufficient elongation at break may not be ensured, which is also not preferred.

In the tire 10 of the present invention, the cords of the rubber-cord reinforcing members 6 preferably have a total fineness of 100 to 1,000 dtex. By using such cords, the above-described effects and a weight reduction can both be attained effectively. In addition, at the same total fineness of the cords, the elongation at break of the cords can be increased by a greater number of primary twists of the cords. For example, when the cords have a total fineness of 300 dtex, cords of 50 dtex/6 cords are more preferred than cords of 100 dtex/3 cords. From this standpoint, in the tire 10 of the present invention, the fineness of primary twist cords constituting the cords is more preferably 50 to 200 dtex. Further, as described above, from the standpoint of increasing the elongation at break, the number of primary twists is not less than 3, preferably not less than 5, more preferably not less than 6.

In the tire 10 of the present invention, the cords used in the rubber-cord reinforcing members 6 are not particularly restricted, and any known cords, for example, nylon cords, polyester cords, aromatic polyamide cords, polyvinyl alcohol fiber cords, polyketone fiber cords, or hybrid cords of any two of the above-described cords can be used; however, from the standpoints of fatigue resistance, adhesion, cost and the like, nylon cords are preferred. Further, the rubber used in the rubber-cord reinforcing members 6 is also not particularly restricted, and any ordinary rubber composition for rubber coating can be used.

In the tire 10 of the present invention, what is only important is that the turn-up ply 2a, the down ply 2b and the rubber-cord reinforcing members 6 satisfy the above-described relationships, and any known constitution can be adopted for other components. For example, in the tire 10 of the present invention, the turn-up ply 2a and the down ply 2b may each be arranged in at least one layer, and the number of carcass plies is not particularly restricted and can be adjusted in accordance with the tire size such that a prescribed pressure resistance can be ensured. In addition, the end count of the cords in each carcass ply can be set in a range of, for example, 25 to 40 cords/50 mm, and the end count of the rubber-cord reinforcing members 6 may be, for example, equal to the cord end count of the carcass ply.

The number of the belt layers constituting the belt 3 is six in the illustrated example; however, the number of the belt layers is not particularly restricted. The belt layers are each formed by, for example, spirally winding a rubber-coated cord in the tire circumferential direction. As the cord, a nylon cord, a polyester cord, an aromatic polyamide cord, a polyvinyl alcohol fiber cord, a polyketone fiber cord, or a hybrid cord of any two of the above-described cords can be used; however, from the standpoints of durability and cost, a nylon cord is preferred. As a coating rubber, any ordinary rubber composition for rubber coating can be used; however, the coating rubber is not restricted thereto.

Further, in the tire 10 of the present invention, a tread pattern is formed as appropriate on the surface of the tread 5, and an inner liner (not illustrated) is formed as an innermost layer. Moreover, as a gas filled into the aircraft tire of the present invention, an air having normal or adjusted oxygen partial pressure, or an inert gas such as nitrogen can be used.

Examples

The tire of the present invention will now be described in detail by way of Examples.

Examples 1 to 4 and Comparative Example

As a tire of Comparative Example, a tire of the type illustrated in FIG. 1 (tire size: 1400×530R23 40PR) was produced. The number of the carcass plies, and the material, structure and physical properties of the cords constituting the rubber-cord reinforcing members were as shown in Table 1. For the thus obtained tire, the pressure resistance, the durability and the tire weight were evaluated. In the same manner, for tires of Examples 1 to 4 having the respective structures shown in Tables 1 and 2, results of the above-described evaluation items were predicted based on the results of Comparative Example. The evaluation methods were as described below.

Conventional Example

A tire having the same structure as the tire of Example 1 was produced as a tire of Conventional Example, except that no rubber-cord reinforcing member was arranged. For this tire of Conventional Example, results of the above-described evaluation items were predicted based on the results of Comparative Example.

(1) Evaluation of Pressure Resistance

After each tire was mounted on a rim having a size of 1400×530R23, the tire was filled with water, and the so-called burst pressure, which is a pressure at which the tire is broken with increasing internal pressure, was measured. The thus measured value was expressed as an index, taking the pressure at which the tire of Conventional Example was broken as 100. A larger value means superior pressure resistance of the tire. The thus obtained results are shown together in Tables 1 and 2.

(2) Evaluation of Durability

Each tire was mounted on a rim having a size of 1400×530R23 and then installed on an indoor drum tester. A takeoff test was repeatedly performed at a prescribed internal pressure of 1,720 kPa and a prescribed load of 34,000 kg, and the number of the tests performed until a tire defect (ply-end separation) occurred was measured. The thus measured value was expressed as an index, taking the number of the tests performed until a defect occurred in the tire of Conventional Example as 100. A larger number means superior durability. The thus obtained results are shown together in Tables 1 and 2.

(3) Tire Weight

The weight of each tire was measured and expressed as an index, taking the weight of the tire of Conventional Example as 100. The results thereof are shown together in Tables 1 and 2.

TABLE 1

|  |  | Conventional Example | Comparative Example | Example 1 | Example 2 |
|---|---|---|---|---|---|
| Carcass | Turn-up ply (number) | 5 | 4 | 4 | 4 |
|  | Down ply (number) | 2 | 2 | 2 | 2 |
| Rubber-cord reinforcing member | Cord type | — | 66 nylon | 66 nylon | 66 nylon |
|  | Cord structure | — | 110 dtex/3 cords | 60 dtex/5 cords | 50 dtex/6 cords |
|  | Elongation at break (%) | — | 22.5 | 37.4 | 42.7 |

TABLE 1-continued

|  | Conventional Example | Comparative Example | Example 1 | Example 2 |
|---|---|---|---|---|
| Final twist coefficient | — | 0.23 | 0.28 | 0.28 |
| Cord strength (N) | — | 26.7 | 19.1 | 18.0 |
| Pressure resistance (index) | 100 | 95 | 103 | 107 |
| Durability (index) | 100 | 101 | 106 | 109 |
| Tire weight (index) | 100 | 95 | 95 | 95 |

TABLE 2

|  |  | Example 3 | Example 4 |
|---|---|---|---|
| Carcass | Turn-up ply (number) | 4 | 4 |
|  | Down ply (number) | 2 | 2 |
| Rubber-cord reinforcing member | Cord type | 66 nylon | 66 nylon |
|  | Cord structure | 50 dtex/6 cords | 50 dtex/6 cords |
|  | Elongation at break (%) | 44.2 | 48.1 |
|  | Final twist coefficient | 0.54 | 0.63 |
|  | Cord strength (N) | 10.1 | 8.8 |
| Pressure resistance (index) |  | 105 | 102 |
| Durability (index) |  | 103 | 100 |
| Tire weight (index) |  | 95 | 95 |

From Tables 1 and 2, it is seen that the aircraft tires according to the present invention was superior to the tire of Conventional Example in terms of light weight, with the number of plies being reduced in the aircraft tires according to the present invention than in the tire of Conventional Example. In addition, it is seen that the aircraft tires according to the present invention were superior also in terms of pressure resistance and durability.

DESCRIPTION OF SYMBOLS

1: bead core
2: carcass
2a: turn-up ply
2aa: main body
2ab: folded portion
2b: down ply
3: belt
4: circumferential groove
5: tread
6: rubber-cord reinforcing member
10: aircraft tire (tire)

The invention claimed is:

1. An aircraft tire comprising:
a pair of bead cores; and
a carcass extending between the pair of the bead cores, wherein
the carcass comprises: at least two turn-up ply layers, each of which is composed of a main body extending between the bead cores, and folded portions that are folded and extend around the respective bead cores from a tire width-direction inner side to an outer side; and at least one down ply layer, which covers a tire width-direction outer side of the respective folded portions of the turn-up ply layers and extends to at least a tire radial-direction inner side of the respective bead cores,
a rubber arranged between an innermost down ply layer and a folded portion of the turn-up ply layers; and
a first rubber-cord reinforcing member arranged between a main body of a tire width-direction outermost turn-up ply layer and a folded portion of a turn-up ply layer extending to a tire radial-direction outermost side, and a second rubber-cord reinforcing layer arranged between the folded portion of the turn-up ply layer extending to the tire radial-direction outermost side and a tire width-direction innermost down ply layer,
cords of the first and second rubber-cord reinforcing members have an elongation at break of not less than 30%, the elongation at break is measured when the cords are removed from the tire and stretched to breakage in accordance with measurement conditions prescribed in JIS L1017.

2. The aircraft tire according to claim 1, wherein the cords of the rubber-cord reinforcing members are made of nylon.

3. The aircraft tire according to claim 1, wherein an inner end of each of the rubber cord reinforcing members is on an outer side in a tire radial direction of the bead core and on an outer side in a tire width direction of the bead core.

4. The aircraft tire according to claim 1, wherein the at least one down ply layer comprises at least two downward ply layers.

5. The aircraft tire according to claim 1, wherein an inner end of the first rubber-cord reinforcement in a tire radial direction is outside a folded portion of a second longest turn-up ply layer.

6. The aircraft tire according to claim 1, wherein the cords of the rubber-cord reinforcing members have a final twist coefficient of 0.25 to 0.60.

7. The aircraft tire according to claim 6, wherein the cords of the rubber-cord reinforcing members are made of nylon.

8. The aircraft tire according to claim 1, wherein the cords of the rubber-cord reinforcing members have an elongation at break of 30% to 45%.

9. The aircraft tire according to claim 8, wherein the cords of the rubber-cord reinforcing members are made of nylon.

10. The aircraft tire according to claim 8, wherein the cords of the rubber-cord reinforcing members have a final twist coefficient of 0.25 to 0.60.

11. The aircraft tire according to claim 10, wherein the cords of the rubber-cord reinforcing members are made of nylon.

12. The aircraft tire according to claim 1, wherein the cords of the rubber-cord reinforcing members have a total fineness of 100 to 1,000 dtex.

13. The aircraft tire according to claim 12, wherein the cords of the rubber-cord reinforcing members are made of nylon.

14. The aircraft tire according to claim 12, wherein the cords of the rubber-cord reinforcing members have a final twist coefficient of 0.25 to 0.60.

15. The aircraft tire according to claim 14, wherein the cords of the rubber-cord reinforcing members are made of nylon.

16. The aircraft tire according to claim 12, wherein the cords of the rubber-cord reinforcing members have an elongation at break of 30% to 45%.

17. The aircraft tire according to claim 16, wherein the cords of the rubber-cord reinforcing members are made of nylon.

18. The aircraft tire according to claim 16, wherein the cords of the rubber-cord reinforcing members have a final twist coefficient of 0.25 to 0.60.

19. The aircraft tire according to claim 18, wherein the cords of the rubber-cord reinforcing members are made of nylon.

* * * * *